US007203956B2

(12) United States Patent
Thomas et al.

(10) Patent No.: US 7,203,956 B2
(45) Date of Patent: Apr. 10, 2007

(54) SYSTEM AND METHOD FOR THE SECURE ENROLLMENT OF DEVICES WITH A CLEARINGHOUSE SERVER FOR INTERNET TELEPHONY AND MULTIMEDIA COMMUNICATIONS

(75) Inventors: Stephen Thomas, Marietta, GA (US); Rodney Scott McManus, Atlanta, GA (US); Rick Vaughn, Roswell, GA (US)

(73) Assignee: TransNexus, Inc., Atlanta, GA (US)

( * ) Notice: Subject to any disclaimer, the term of this patent is extended or adjusted under 35 U.S.C. 154(b) by 984 days.

(21) Appl. No.: 09/747,365

(22) Filed: Dec. 22, 2000

(65) Prior Publication Data

US 2002/0049654 A1 Apr. 25, 2002

Related U.S. Application Data

(60) Provisional application No. 60/171,375, filed on Dec. 22, 1999.

(51) Int. Cl.
*G06F 17/00* (2006.01)
(52) U.S. Cl. .................... 726/10; 726/4; 726/5
(58) Field of Classification Search .............. 705/35, 705/24; 379/106.09; 726/10, 4, 5
See application file for complete search history.

(56) References Cited

U.S. PATENT DOCUMENTS

| | | | |
|---|---|---|---|
| 4,726,056 A | 2/1988 | An et al. | |
| 4,979,118 A | 12/1990 | Kheradpir | 364/436 |
| 5,155,763 A | 10/1992 | Bigus et al. | 379/113 |
| 5,185,780 A | 2/1993 | Leggett | 379/34 |
| 5,251,152 A | 10/1993 | Notess | 364/550 |
| 5,325,290 A | 6/1994 | Cauffman et al. | 364/401 |
| 5,404,516 A | 4/1995 | Georgiades et al. | 395/650 |
| 5,408,465 A | 4/1995 | Gusella et al. | 370/17 |
| 5,434,848 A | 7/1995 | Chimento, Jr. et al. | |
| 5,473,630 A | 12/1995 | Penzias et al. | |
| 5,563,939 A | 10/1996 | La Porta et al. | |
| 5,570,417 A | 10/1996 | Byers et al. | |
| 5,581,544 A | 12/1996 | Hamada et al. | 370/253 |
| 5,600,794 A | 2/1997 | Callon | 395/200.01 |
| 5,606,602 A | 2/1997 | Johnson et al. | |
| 5,633,919 A | 5/1997 | Hogan et al. | |
| 5,638,433 A | 6/1997 | Bubien, Jr. et al. | |
| 5,668,955 A | 9/1997 | deCiutiis et al. | |
| 5,675,636 A | 10/1997 | Gray | |
| 5,712,907 A | 1/1998 | Wegner et al. | |
| 5,740,361 A | 4/1998 | Brown | 395/187.01 |
| 5,790,642 A | 8/1998 | Taylor et al. | |

(Continued)

FOREIGN PATENT DOCUMENTS

EP 0 781 015 A2 6/1997

(Continued)

OTHER PUBLICATIONS

"Introduction to SSL", Oct. 9, 1998, [Retrieved from Internet May 19, 2004], "http://developer.netscape.com/docs/manuals/security/sslin/contents.htm".*

(Continued)

*Primary Examiner*—David Jung
(74) *Attorney, Agent, or Firm*—King & Spalding LLP

(57) ABSTRACT

Enrolling devices with a clearinghouse server for Internet telephony and multimedia communications. Enrollment can be the process of taking a network device (such as a router, gateway, gatekeeper, etc.) and exchanging encrypted information with the clearinghouse server, so that later communications with that device can be secured. The enrollment is done with levels of security and verification that ensures the devices and clearinghouse server is legitimate.

16 Claims, 4 Drawing Sheets

U.S. PATENT DOCUMENTS

| | | | |
|---|---|---|---|
| 5,799,072 A | 8/1998 | Vulcan et al. | |
| 5,867,495 A | 2/1999 | Elliott et al. | |
| 5,892,753 A | 4/1999 | Badt et al. | 370/233 |
| 5,898,668 A | 4/1999 | Shaffer | 370/230 |
| 5,898,673 A | 4/1999 | Riggan et al. | 370/237 |
| 5,917,891 A | 6/1999 | Will | 379/88.03 |
| 5,917,897 A | 6/1999 | Johnson et al. | |
| 5,917,902 A | 6/1999 | Saucier | |
| 5,943,657 A | 8/1999 | Freestone et al. | |
| 5,966,427 A | 10/1999 | Shaffer et al. | |
| 5,991,373 A | 11/1999 | Pattison et al. | 379/93.17 |
| 5,995,554 A | 11/1999 | Lang | 375/295 |
| 6,005,925 A | 12/1999 | Johnson et al. | |
| 6,005,926 A | 12/1999 | Mashinsky | |
| 6,049,531 A | 4/2000 | Roy | |
| 6,067,287 A | 5/2000 | Chung-Ju et al. | 370/232 |
| 6,085,238 A | 7/2000 | Yuasa et al. | 709/223 |
| 6,128,280 A | 10/2000 | Jamoussi et al. | 370/230 |
| 6,128,304 A | 10/2000 | Gardell et al. | |
| 6,137,869 A | 10/2000 | Voit et al. | 379/114.01 |
| 6,157,648 A | 12/2000 | Voit et al. | 370/401 |
| 6,178,510 B1 | 1/2001 | O'Connor et al. | |
| 6,205,211 B1 | 3/2001 | Thomas et al. | |
| 6,229,804 B1 | 5/2001 | Mortsolf et al. | |
| 6,240,449 B1 | 5/2001 | Nadeau | |
| 6,259,691 B1 | 7/2001 | Naudus | 370/352 |
| 6,263,051 B1 * | 7/2001 | Saylor et al. | 379/88.17 |
| 6,275,490 B1 | 8/2001 | Mattaway et al. | 370/352 |
| 6,304,551 B1 | 10/2001 | Ramamurthy et al. | 370/232 |
| 6,310,873 B1 | 10/2001 | Rainis et al. | 370/356 |
| 6,339,595 B1 | 1/2002 | Rekhter et al. | 370/392 |
| 6,345,090 B1 | 2/2002 | Walker et al. | 379/114.12 |
| 6,366,577 B1 | 4/2002 | Donovan | 370/352 |
| 6,404,746 B1 | 6/2002 | Cave et al. | 370/352 |
| 6,426,955 B1 | 7/2002 | Gossett Dalton, Jr. et al. | 370/401 |
| 6,430,282 B1 | 8/2002 | Bannister et al. | 379/211.02 |
| 6,459,708 B1 | 10/2002 | Cox et al. | 370/537 |
| 6,477,164 B1 | 11/2002 | Vargo et al. | 370/356 |
| 6,487,283 B2 | 11/2002 | Thomas et al. | 379/112.01 |
| 6,526,131 B1 * | 2/2003 | Zimmerman et al. | 379/106.09 |
| 6,570,870 B1 | 5/2003 | Berstis | 370/352 |
| 6,611,519 B1 | 8/2003 | Howe | 370/428 |
| 6,614,781 B1 | 9/2003 | Elliott et al. | 370/352 |
| 6,615,349 B1 | 9/2003 | Hair | 713/165 |
| 6,658,568 B1 | 12/2003 | Ginter et al. | 713/193 |
| 6,665,271 B1 | 12/2003 | Thomas et al. | 370/252 |
| 6,680,948 B1 | 1/2004 | Majd et al. | 370/401 |
| 6,707,812 B1 | 3/2004 | Bowman-Amuah | 370/353 |
| 6,735,177 B1 | 5/2004 | Suzuki | 370/238 |
| 6,751,652 B1 | 6/2004 | Thomas | 709/204 |
| 6,757,823 B1 * | 6/2004 | Rao et al. | 713/153 |
| 6,765,896 B1 | 7/2004 | Ahmed et al. | 370/338 |
| 6,795,867 B1 | 9/2004 | Ma et al. | 709/227 |
| 6,996,093 B2 | 2/2006 | Dalton, Jr. et al. | 370/356 |
| 7,017,050 B2 | 3/2006 | Dalton, Jr. et al. | 713/201 |
| 2003/0095541 A1 | 5/2003 | Chang et al. | 370/352 |
| 2003/0193933 A1 | 10/2003 | Jonas et al. | 370/356 |

FOREIGN PATENT DOCUMENTS

| | | |
|---|---|---|
| EP | 0 824 295 A2 | 2/1998 |
| EP | 0 948 164 | 10/1999 |
| GB | 2 301 264 | 11/1996 |
| WO | WO 97/14236 | 4/1997 |
| WO | WO 97/23078 | 6/1997 |
| WO | WO 98/18237 | 4/1998 |
| WO | WO 98/36543 | 8/1998 |
| WO | WO 98/37665 | 8/1998 |
| WO | WO 98/48542 | 10/1998 |
| WO | WO 99/11051 | 3/1999 |
| WO | WO 99/14931 | 3/1999 |
| WO | WO 99/14932 | 3/1999 |
| WO | WO 99/26153 | 5/1999 |
| WO | WO 00/48102 | 8/2000 |
| WO | WO 00/49551 | 8/2000 |
| WO | WO 00/52905 | 9/2000 |
| WO | WO 01/47232 A2 | 6/2001 |
| WO | WO 01/47235 A2 | 6/2001 |
| WO | WO 01/52476 A2 | 7/2001 |
| WO | WO 01/63820 A2 | 8/2001 |
| WO | WO 02/23854 A2 | 3/2002 |
| WO | WO 05/089147 A2 | 9/2005 |

OTHER PUBLICATIONS www.transnexus.com, as printed out in year 2005.*

ETSI TS 101 321 V4.1.1 Technical Specification .*

Parlay and mobile agents in a homogenized service provision architecture; Chaniotakis et al..; Universal Multiservice Networks, 2002. ECUMN 2002. 2nd European Conference on Apr. 8-10, 2002 pp. 150-154.*

Mobile Internet telephony protocol: an application layer protocol for mobile Internet telephony services; Wanjiun Liao; Communications, 1999. ICC '99. 1999 IEEE International Conference on vol. 1, Jun. 6-10, 1999 pp. 339-343 vol. 1.*

Internet protocol support for telephony; Maresca et al.; Proceedings of the IEEE; vol. 92, Issue 9, Sep. 2004 pp. 1463-1477.*

Johannesson, Nils Olof, "*The ETSI Computation Model: A Tool for Transmission Planning of Telephone Networks*," IEEE Communications Magazine, Jan. 1997, pp. 70-79.

Netscape Communications Corporation, "*Introduction to SSL*," Oct. 9, 1998, [Retrieved from Internet May 19, 2004], http://developer.netscape.com/docs/manuals/security/sslin/contents.htm, pp. 12.

Sin, Sam-Kit et al., "*A New Design Methodology for Optimal Interpolative Neural Networks with Application to the Localization and Classification of Acoustic Transients*," IEEE Conference on Neural Networks for Ocean Engineering, 1991, pp. 329-340.

"Agis and Popstar Introduce Profit-Generating Internet Fax Services to ISP Partners and Customers Worldwide," Press Release from www.transnexus.com/News/Press_Releases/press4/press4.html, San Jose, CA—Jun. 24, 1999, pp. 1-3.

"TransNexus Integrates Industry Leader RSA Security's BSAFE Encryption Software Into Its ClearIP Clearinghouse Solution," article from www.rsasecurity.com/news/pr/99102.html, Oct. 21, 1999, pp. 1-2.

PCT International Preliminary Report dated Jan. 23, 2006 for International Application No. PCT/US01/28931.

The Ascend Max Voice Gateway, XP-002096239, "The asnet pipeline," www.asnet.co.nz/pipeline/sum97/tamvg.html, Mar. 11, 1999.

Hansson, et al. "Phone Doubler—A step towards integrated Internet and telephone communities," Ericsson Review No. 4, 1997, pp. 142-151.

AT&T Communications, Adm. Rates and Tariffs, TariffFCC No. 1, 3$^{rd}$ Revised p. 178.69.1.

G. A. Thom; The Multimedia Communications Standard for Local Area Networks, Dec. 1996, pp. 52-56, IEEE Communications Magazine.

S. Rudkin, A Grace and MW Whybray, Real-Time Applications on the Internet, Apr. 1997, pp. 209-225, BT Technol J vol. 15, No. 2.

* cited by examiner

SYSTEM AND METHOD FOR THE SECURE ENROLLMENT OF DEVICES WITH A CLEARINGHOUSE SERVER FOR INTERNET TELEPHONY AND MULTIMEDIA COMMUNICATIONS

PRIORITY AND RELATED APPLICATIONS

The present application claims priority to provisional patent application entitled, "Automated Support of Internet Telephony Clearinghouse Services," filed on Dec. 22, 1999 and assigned U.S. application Ser. No. 60/171,375. The present application is also related to the following pending applications: U.S. Provisional Patent Application Ser. No. 60/231,642, entitled, "Clearinghouse Server for Internet Telephony and Multimedia Communications," filed on Sep. 11, 2000, assigned to the assignee of the present application and hereby fully incorporated herein by reference; U.S. application Ser. No. 09/747,430, entitled, "Call Detail Record Method and System for Internet Telephony Clearinghouse System," filed on Dec. 22, 2000; U.S. application Ser. No. 09/747,418, entitled, "User Interface for Internet Telephony Clearinghouse System," filed on Dec. 22, 2000; and U.S. application Ser. No. 09/747,347, entitled, "Rate Provisioning Method and System for Internet Telephony Clearinghouse System," filed on Dec. 22, 2000.

TECHNICAL FIELD

The present invention is generally directed to telephony and multimedia communications carried by a distributed computer network, such as the global Internet. More specifically, the present invention relates to the secure enrollment of devices with a clearinghouse server so that communication can be routed between an originating device and a terminating device via the Internet.

BACKGROUND OF THE INVENTION

Telecommunications networks are experiencing a drastic technology shift—from a circuit-switched architecture (such as the current voice phone network) to a packet-switched architecture (such as the global Internet). Worldwide, the capacity of deployed packet-switched networks is doubling every year while circuit-switched capacity is only increasing at an annual rate of around 6%. In many developed regions, packet-switched capacity already exceeds circuit-switched capacity. Recognizing this trend, telecommunications providers have begun to optimize their networks for the technology that is expected to dominate future growth: packet-switching. As they deploy packet-switched technology, these providers must still support traditional circuit-switched applications such as voice and facsimile. Instead of operating parallel network infrastructures, however, clearinghouse service providers seek to support those applications over a packet-switched network. This approach offers several advantages: greater efficiency through the use of a single, common, network infrastructure; lower cost through a reliance on packet-switching equipment; and better support of innovative new services through an open architecture.

As circuit-switched applications move to a packet-switched network, service providers need a way to identify systems on the packet-switched network that are associated with addresses (typically telephone numbers) common to the circuit-switched world. Providers must also have a means to authorize communications, and to ensure that unauthorized communications do not consume bandwidth. For example, the provisioning of a physical, circuit-switched, connection between two providers typically serves as authorization for the providers to share traffic. In a packet-switched environment, however, communicating parties need not share a physical connection and some other means of authorizing traffic is required. Finally, providers must have a reliable way to collect information from packet-switched devices to account for customer usage (e.g., for billing).

There remains a need in the art for a convenient, centralized application to provide authorization, or enrollment, for circuit-switched applications in a packet-switched network environment. Enrollment is the process of taking a device and exchanging sufficient cryptographic information with the clearinghouse server so that later communications with that device can be secured.

The conventional art does not provide an effective, secure way to enroll a device with a clearinghouse server. In particular, the identity of the clearinghouse server is verified by a telephone call. This verification has many drawbacks. Telephone calls are not automated, and require contact with people. As people have certain work hours, and cannot be relied upon to always be available, the telephone call verification is impractical, and time consuming. In addition, as packet-switched architecture becomes more and more popular, this problem will become more pronounced.

SUMMARY OF THE INVENTION

The present invention provides for the secure enrollment of a device for operation with a clearinghouse server, also described as a clearinghouse enrollment server, so that telephony and multimedia communications can be routed between an originating device and a terminating device via the Internet. The enrollment process is typically completed by a network device (such as a router, gateway, gatekeeper, etc.) and the clearinghouse server. This source device and the clearinghouse server can exchange encrypted information, so that later communications with that device can be secured. Once this verification process is finished, the device can have a public key certificate that is valid for a certain length of time (such as one year). Once this length of time has passed, however, the certificate can expire and the device must re-enroll. The enrollment process can also provide the device with a certificate authority's (CA) public key certificate. The device can use the CA's certificate to authenticate subsequent communications from other clearinghouse servers.

To enroll, the device can tell the clearinghouse server its public key. Then the device can prove that it possesses the private key that corresponds to the public key. This can be done by taking information provided by the clearinghouse enrollment server, and having the device encrypt it with the private key. The device can then send this information to the clearinghouse enrollment server. If the clearinghouse enrollment server can then decrypt the information, the clearinghouse enrollment server can verify that the device possesses the private key.

When the device tells the clearinghouse enrollment server its public key, a security issue arises. If an illegitimate user successfully intercepts, redirects, or captures the public key when it is sent to the clearinghouse enrollment server, the illegitimate user could take the place of the legitimate clearinghouse server. The illegitimate user could then be able to decrypt the encrypted message that the device sends, and would seem to be a legitimate clearinghouse enrollment server. Thus, the identity of the clearinghouse enrollment server must be verified.

Rather than using the conventional telephone call to verify the clearinghouse enrollment server's identity, the present invention can rely on the Web infrastructure to securely identify the clearinghouse enrollment server. The present invention does this by having the device pre-configured with a third party CA certificate. The clearinghouse enrollment server obtains a public key certificate under the authority of this CA certificate, and it provides that certificate, along with proof of possession of the corresponding private key, in the initial communications with the device.

In view of the foregoing, it will be appreciated that the present invention provides a method for secure enrollment of a device with services of a clearinghouse enrollment server to supporting communications carried by an Internet telephony system. A device can initiate a request to enroll for the services of the clearinghouse enrollment server. In turn, the identity of the clearinghouse enrollment server is verified a communication exchange between the device and the clearinghouse enrollment server. This exchange is supported by use of a security infrastructure comprising the Secure Sockets Layer (SSL) and a public key infrastructure. In response to verifying the identity of the clearinghouse enrollment server, enrollment of the device is completed at the clearinghouse enrollment server to all the device to access the communication services of the Internet telephony network.

More specifically, the present invention provides a for secure enrollment of a device with services of a clearinghouse server for an Internet telephony system. In response to obtaining an identity of the clearinghouse server, the device issues a CA certificate request to the clearinghouse server using that obtained identity. In response to the CA certificate request, the clearinghouse server transmits a CA certificate to the device. The device next determines whether the clearinghouse is a valid and secure service provider by verifying the CA certificate. Responsive to verification of the CA certificate, the device generates a combination of a private key and a public key and issues to the clearinghouse server a request for enrollment comprising the public key. In turn, the clearinghouse server generates a public key certificate and transmits the public key certificate to the device. This enables the device to securely verify the identity of the clearinghouse server and to complete device enrollment at the clearinghouse server.

These and other aspects of the present invention will be shown in the attached drawing set and following detailed description.

DETAILED DESCRIPTION OF THE EXEMPLARY EMBODIMENTS

The present invention provides a clearinghouse solution for routing multi-media communications, including telephony calls, between a source device and a destination device via a distributed computer network, such as the global Internet. The present invention also authorizes the completion of a communication from a source device to a destination device and collects usage-related information for the completed communication. The clearinghouse server constructed in accordance with the inventive concept can identify one or more available destination devices available to accept a communication from an authorized source device based upon the source of that communication. An exemplary embodiment of the clearinghouse server can operate in either a "WINDOWS" or "SOLARIS" operating system environment in support of Web-based communications in a distributed computer network.

Figure 1:
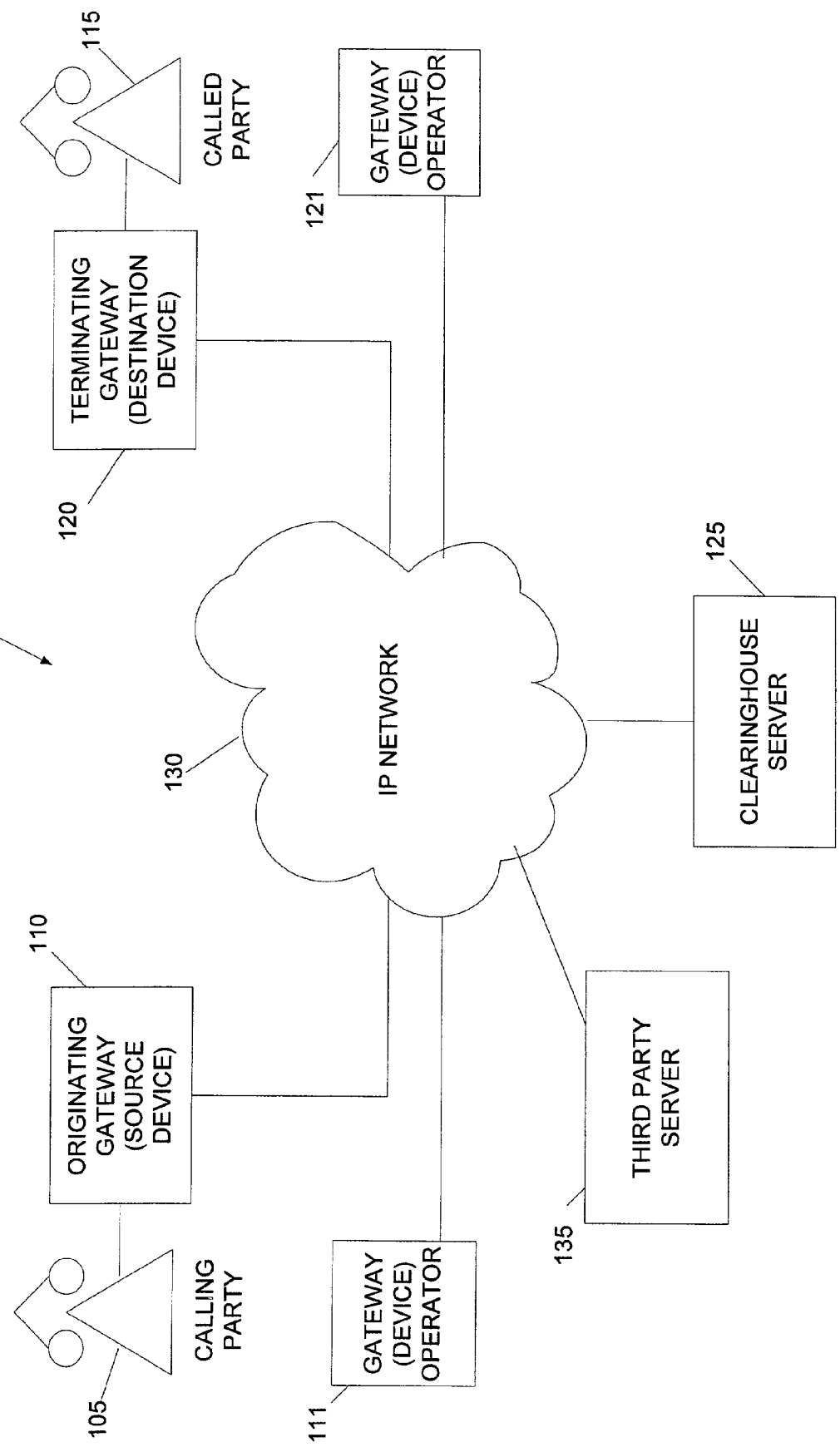
FIG. 1 is a functional block diagram of the operating environment in accordance with an exemplary embodiment of the present invention.

Turning now to the drawings, in which like reference numbers identify like elements of exemplary embodiments of the present invention, FIG. 1 is a functional block diagram illustrating a representative operating environment for an exemplary embodiment of the present invention. A communication system 100 comprises one or more originating devices (such as gateways) 110, one or more terminating devices (such as gateways) 120, device operators 111 and 121 for each of the two devices, a clearinghouse server 125, and a third party server 135, each coupled to an Internet Protocol (IP) network 130. Although FIG. 1 illustrates an operating environment including only a single originating gateway 110 and a single terminating gateway 120, those skilled in the art will appreciate that the operating environment of the communication system 100 can include multiple originating gateways and terminating gateways. For purposes of this document, an originating gateway will be referred to as a source device, and a terminating gateway will be referred to as a terminating device. The IP network 130 represents a distributing computer network and can be implemented by the global Internet, a wide area network (WAN), or an enterprise-wide local area network (LAN).

To initiate a communication supported by the communication system 100, a calling party 105 sends an outgoing call having a called telephone number to the source device 110. For this representative example, the calling party 105 has an established a relationship with the source device 110, such as a subscription to call origination services provided by that source device. To be an authorized user of the clearinghouse services provided by the clearinghouse server 125, the gateway operators 111 or 121 can enroll source device 110 and destination device 120 for operation with the clearinghouse server 125. The enrollment process involves the exchange of information between the gateway operators 111 or 121, the clearinghouse server 125, and the third party server 125. (not affiliated with either the operators or clearinghouse server). This enrollment process is the subject of the present invention. Following the enrollment process, the source device 110 sends an authorization request message to the clearinghouse server 125 via the IP network 130 to request the completion of the outgoing call with an available designation device 120. The authorization request typically comprises the called telephone number, otherwise described as the dialed number, a call identifier to uniquely identify the outgoing call and, for certain applications, the telephone number for the calling party 105 and payment authorization, such as a calling card number and a personal identification number (PIN).

If the clearinghouse server 125 determines that the source device 110 is an authorized user of clearinghouse services, the clearinghouse server 125 can identify one or more destination devices for handling the outgoing call. The source device 110 can use the information provided by the clearinghouse server 125 in the authorization response to contact a selected destination device 120 and to complete the incoming call via the IP network 130. In turn, the selected destination device 120 can communicate the outgoing call to a called party 115, typically via the Public Switched Telephone Network (PSTN). In this manner, the outgoing call is connected between the calling party 105 and the called party 115 by a combination of a distributed computer network and the PSTN.

Figure 2:
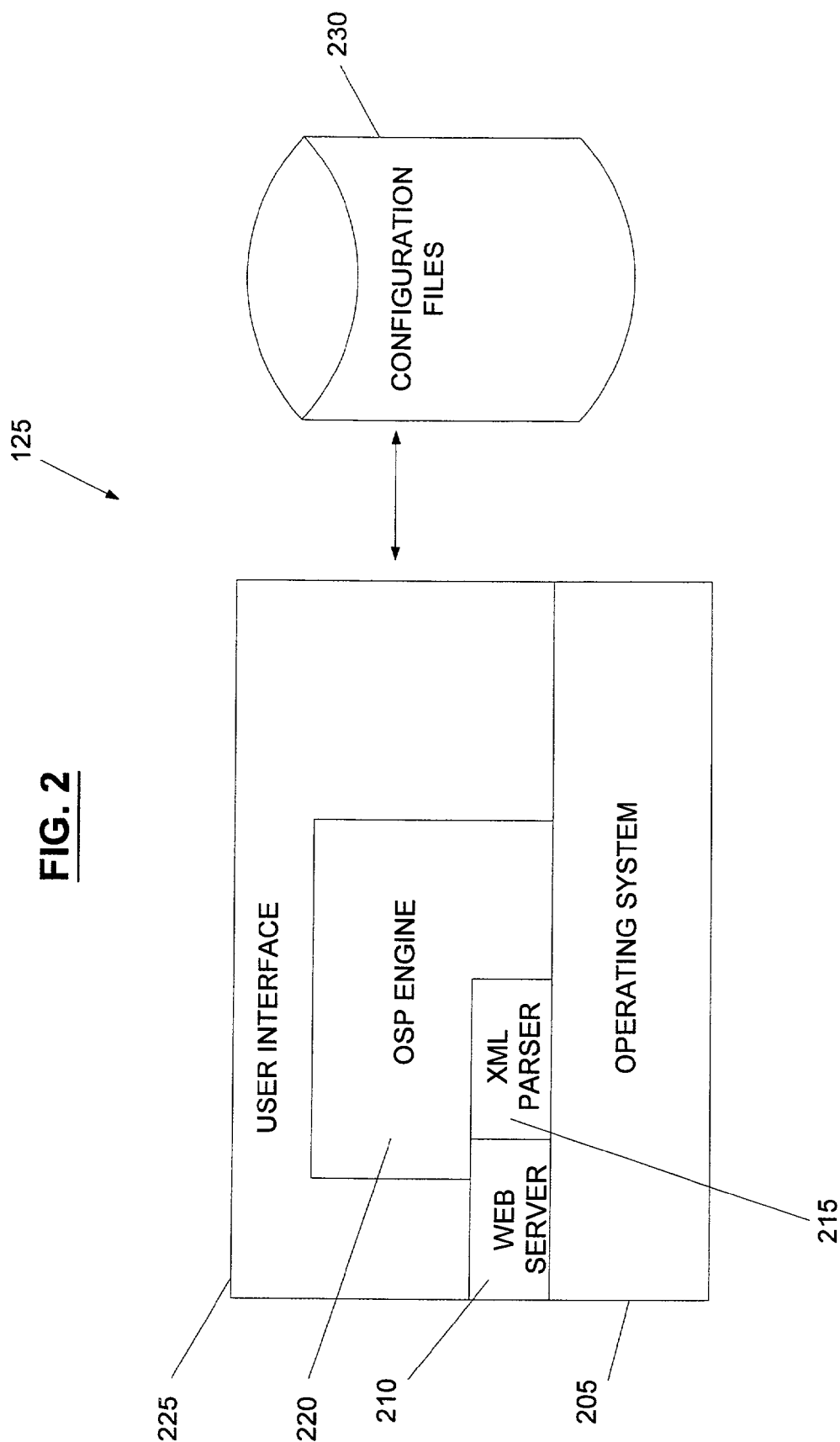
FIG. 2 is a functional block diagram of the architecture of a clearinghouse server in accordance with an exemplary embodiment of the present invention.

FIG. 2 is a functional block diagram illustrating the components of a clearinghouse server constructed in accordance with an exemplary embodiment of the present invention. An exemplary clearinghouse server 125 comprises an operating system 205, a Web server 210, an XML parser, a clearinghouse engine 220, and a user interface 225. The clearinghouse server 125 can be coupled to a database comprising one or more configuration files 230 to support clearinghouse operations.

The platform of the clearinghouse server 125 is provided by the operating system 205, which is preferably implemented by Microsoft Corporation's "WINDOWS 2000" or Sun Microsystem's "SOLARIS" operating systems. Although the "WINDOWS" and the "UNIX" platforms represent preferred platforms, it will be appreciated that the inventive concept of a clearinghouse server 125 can be supported by other operating systems and is not limited to those described herein. The operating system 205 communicates with the Web server 210.

The Web server 210 supports Web-based communications with client computers in a Web-enabled computing environment, including the source devices illustrated in FIG. 1. The XML parser 215 can accept messages from the clearinghouse engine 220 and convert those messages to XML format for communication via the Web server 210. The XML parser 215 also can extract information from an XML message received by the Web server 210 and supply the extracted information to the clearinghouse engine 220. The Web server 210 also communicates with the user interface 225 via application programming interfaces (APIs). The Web server 210 is preferably implemented by an "XITAMI" server available from iMatix Corporation sprl of Antwerpen, Belgium.

The clearinghouse engine 220 supports the processing of clearinghouse transactions and communicates with the operating system 205, the Web server 210, and the user interface 225. APIs can be used to access functions supported by the clearinghouse engine 220. The clearinghouse engine 220 also can access configuration files maintained by the configuration database 230 in support of clearinghouse transactions. The configuration files typically contain descriptive information identifying characteristics of enrolled source devices and clearinghouse transaction records, including transaction identifiers assigned to transactions by the clearinghouse server 125.

The user interface 225 provides a mechanism for a user, such as an assistant administrator, to input information about the clearinghouse environment, including details about enrolled source devices and destination devices. The user interface 225 also can present the user with information related to clearinghouse transaction records stored by the clearinghouse server 125.

Secure Enrollment

Referring again to FIG. 1, the present invention provides a system and method for the secure enrollment of a device for operation with a clearinghouse server 125. Enrollment is the process of taking a network device (such as a router, gateway, gatekeeper, etc.) and exchanging encrypted information with the clearinghouse server 125, so that later communications with that device can be secured. There are several types of devices, including originating devices 110 and terminating devices 120. As the process of enrollment is described, all devices will be referred to as originating or source devices 110. This is not meant to limit the applicable devices to only source devices, but is meant to illustrate that any type of device can be used. Once this process is finished, the device 110 should have a certificate that is valid for a certain length of time (such as one year). Once this length of time has passed, the certificate will expire and the device 110 must re-enroll.

This invention works for any type of service or device 110 that requires secured communications. This includes devices 110 under the direct control of human users (like a personal computer or a IP-based telephone) and those that are automated and not under the direct control of human users.

Exemplary Encryption Environment

In light of the discussion of public keys and private keys, a general discussion of an exemplary encryption environment may prove beneficial for understanding the present invention. Encryption is the process of encoding data to prevent unauthorized access, especially during transmission. Encryption is usually based on one or more keys, or codes, that are essential for decoding, or returning the data to readable form. An encryption key is a sequence of data that is used to encrypt other data and that, consequently, must be used for the data's decryption. Decryption is the process of restoring encrypted data to its original form.

Public key encryption is a process that uses a pair of keys for encryption: a private (secret) key and a public key. The private key can encrypt messages and can create a unique electronic number (called a digital signature) that can be read by anyone possessing the corresponding public key. The private key can also be used to decrypt messages encrypted with the public key. The public key can be used for encrypting messages to be sent to the user and for decrypting the user's digital signature.

A certification authority ("CA") is an organization that assigns digital certificates. A CA may be an external issuing company (such as VeriSign) or an internal company authority that has installed its own certificate server 125 (such as a Microsoft Certificate Server) for issuing and verifying certificates. A CA is responsible for verifying the identity of a party and, if that identity is accepted, digitally signing that party's public key certificate. Other parties (that possess and trust the CA's public key, can then verify the applicant's identity merely by verifying the CA's signature of the public key certificate.

A CA certificate (sometimes called a digital certificate) is a user identity card for cyberspace. Issued by a CA, a CA certificate is an electronic credential that demonstrates that a user or site is trusted for the purpose of security and computer authentication.

Overview of Exemplary Enrollment Process

The enrollment process begins when the device generates a public/private key pair. It then establishes a secure communication channel with the clearinghouse enrollment server using the Secure Sockets Layer (SSL) protocol. The SSL exchange provides the device with a public key certificate for the enrollment server. That certificate is digitally signed by the third party certificate authority, who, therefore, vouchsafes for the enrollment server's identity.

Once the secure communications path is established, the enrollment server sends the device CA certificates of a (potentially different) certificate authority. Certificates certified by this additional CA will be used in subsequent communications with the clearinghouse. The additional CA may be the same CA as is authenticating the enrollment server, but it need not be so. By permitting them to differ, the present invention allows for different public key infrastructures for enrollment and for operational clearinghouse communications (e.g. routing telephone calls).

After receiving the CA certificate, the device then sends the enrollment server the previously generated public key. The enrollment server receives this public key and, either immediately or at a later time (e.g. after an administrator has verified that the customer intended to enroll the device in question), the enrollment server issues the device a certificate containing the device's public key.

Message Formats

All messages sent to the clearinghouse enrollment server are carried in HTTP (version 1.1) POST messages. All replies are returned in responses to the POST. Each POST request contains a series of ASCII variable=value pairs, encoded as given in RFC 1738. Any response also consists of variable/value pairs. The following Table 1 lists the variables that can be included in a message. Note that non-alphanumeric characters are encoded as a "%" and their corresponding two hexadecimal digits (as specified in RFC 1738.)

TABLE 1

| | |
|---|---|
| cacert=<cert> | base64-encoded authority certificate |
| certreq=<pkcs10> | base64-encoded certificate request |
| customer=<custID> | clearinghouse-assigned customer number |
| device=<devID> | clearinghouse-assigned device id |
| nonce=<nonce> | random value to increase security |
| operation=<req.type> | getcacert, request, or retrieve |
| password=<pwd> | password for clearinghouse services |
| username=<username> | username for clearinghouse services |

The following example in Table 2 shows a sample CA certificate request message. In it, the device asks for the enrollment server's CA certificate in cleartext:

TABLE 2

POST HTTP/1.1
Host: enroll.transnexus.com
content-type: text/plain
Content-Length: 19
Connection: Keep-Alive
operation=getcacert The response received from the enrollment server might look like the example shown in Table 3:

TABLE 3

HTTP/1.1 200 OK
Server: TNS/1.0
Connection: Keep-Alive
Content-Type: text/plain
Content-Length: 693 status=0&certificate=MIIB9DCCAV2gAwIBAgIRANs4gtN4kbWX1wvw8YsAjxMwD

QYJKoZIhvcNAQEEBQAwFTETMBEGA1UEChMKVHJhbnNOZXh1czAeFw05OTAzMTgwMDA wMDBaFw0wOTAzMTgyMzU5NT1aMBUxEzARBgNVBAoTC1RyYW5zTmV4dXMwgZ8wDQYJK oZIhvcNAQEBBQADgY0AMIGJAoGBAKuR4hI8P+g96Go7ihjfdQ+3VjA01pIqNjaSch+ eWWzbBG+q+aISaCsQM53elNuxMudoCFN27J7H4v0LuStDj+wSQzWjP41BOQUXry1tR i=qwRaK5Vh1wybHejOByURb4Qex5myhEbNWAxOimgCBIB2Exf4k5FJjOMUs795rlUp XAgMBAAGjRDBCMCIGA1UdEQQbMBmkFzAVMRMwEQYDVQQDEwpPbnNpdGUyLTYyMA8GA 1UdEwQIMAYBAf8CAQAwCwYDVR0PBAQDAgEGMAOGCSqGSIb3DQEBBAUAA4GBAEgeTxN 56ztf2bzu2Zxla/e0IWexTeEbjCQNNEZaFOLhp50kVBGoQQkX7260ivOGx4IJdTv3Y HYc7BOi1pU0jW1Pc/DVkhHd1Q/gDSNFgwAqJCx2nmlfr9TuEtAUWAxd/PN38//yDyX Wgx5PKyU9+pyLPgCoAC8D17wMGdh+oTSm Once the CA certificate is retrieved, the certificate request is encrypted and transmitted to the enrollment server for approval. The initial request (before it is encrypted) looks like the representative example shown in Table 4:

TABLE 4

POST HTTP/1.1
Host: enroll.transnexus.com
content-type: text/html
Content-Length: 714
Connection: Keep-Alive
operation=request&nonce=1502767911902931&username=mcmanus&password
=01234567&device=134217728&customer=0&request=MIIBtTCCAR4CAQAwWzEL
MAkGA1UEBhMCVVMxEDAOBgNVBAgTB0dlb3JnaWExGCAWBgNVBAoTD1RyYW5zTmV4dX
MsIExMQzEgMB4GA1UEAxMXdGVzdHRlcDQudHJhbnNuZXh1cy5jb20wgZ8wDQYJKoZI
hvcNAQEBBQADgY0AMIGJAoGBALhYeWbF8HrVIRVMW4p2H2DZhs9tEisHe1ynyUEIcC
4n9CLW104HW0zeSzNMtYBQrqJ6qZMhc0RKZ%2BMQA9E1s9hvN8TLo4KDBPXmQWEQg6
R9f3TokpIh0J4b0wpj9WeXAiyNyTq7hTgQdtPYN65xq92t5CkHpWBWEya9v2Ux9I27
AgMBAAGgGjAYBgkqhkiG9w0BCQcxCxMJcGFzc3dvcmQAMA0GCSqGSIb3DQEBBAUAA4
GBAFC7sCjCbmVgUYenJR8XgMTLilQFSSq4YJ9BcmiYsZZ6KOxFxNgEf84wyRscdrP9
LV9EhQM%2BS3GEAEw%2FLxCRHGGgyS1%2FYpNmavs51thGep1H%2BAFW%2Blnds9CY
UwyKx%2F8veFJFC6y6pYhD7RyZxyKNnzBhgxAxU3rUgr3Cm78RbT1G The retrieve function only differs in the "operation" parameter, in which the "request" value is replaced by "retrieve". Otherwise, all parameters have the same names and values.

If the enrollment request is pending further approval, then the enrollment server is only required to send the status of the certificate request. It may send a nonce along with the response, but this value is not guaranteed. The response should look like the representative example shown in Table 5:

TABLE 5

HTTP/1.1 200 OK
content-type: text/plain
content-length: 31
status=1&nonce=A1F0765F71C9E6AD If the enrollment request has been processed and accepted by the server, it will return a response such as the following in Table 6. Note that a status of 0 indicates that the certificate is now ready for retrieval.

TABLE 6

HTTP/1.1 200 OK
content-type: text/plain
content-length: 694
status=0&cert=MIICfjCCAeegAwIBAgIQARAm+
prL9zmocfkRWNN0fjANkqhkiG9w
0BAQQFADAV . . .

Figure 3A:
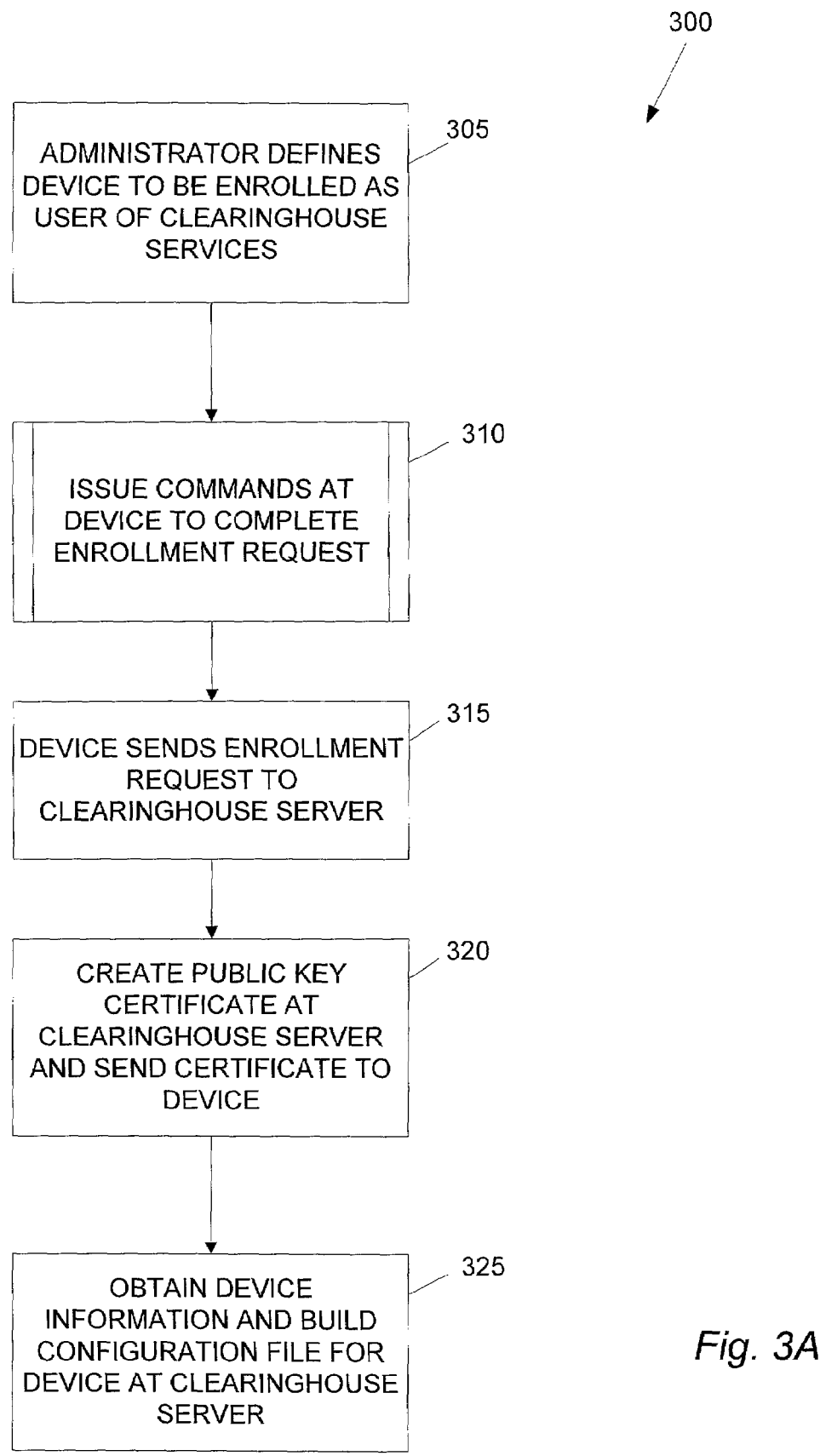
FIG. 3A is a logical flow chart diagram illustrating steps for enrolling a source device for operation with a clearinghouse server in accordance with an exemplary embodiment of the present invention.

FIG. 3A is a logical flow chart diagram illustrating exemplary steps completed during the enrollment of a source device for operation with a clearinghouse server. Turning now to FIG. 3A, an exemplary enrollment process 300 is initiated in response to a user, typically an assistant administrator, defining a source device to be enrolled as a "user" or subscriber of clearinghouse services. A source device is typically identified by an IP address or a Domain Name System (DNS) name. In addition, the administrator can assign the source device to a particular Group of devices having one or more common characteristics.

In step 310, commands are issued at the source device to complete an enrollment request for transmission to the clearinghouse server. These commands are typically device dependent and often require support by an administrator to select the appropriate enrollment instructions. Representative enrollment request tasks completed by the source device for step 310 are shown in the logical flow chart diagram of FIG. 3B.

Figure 3B:
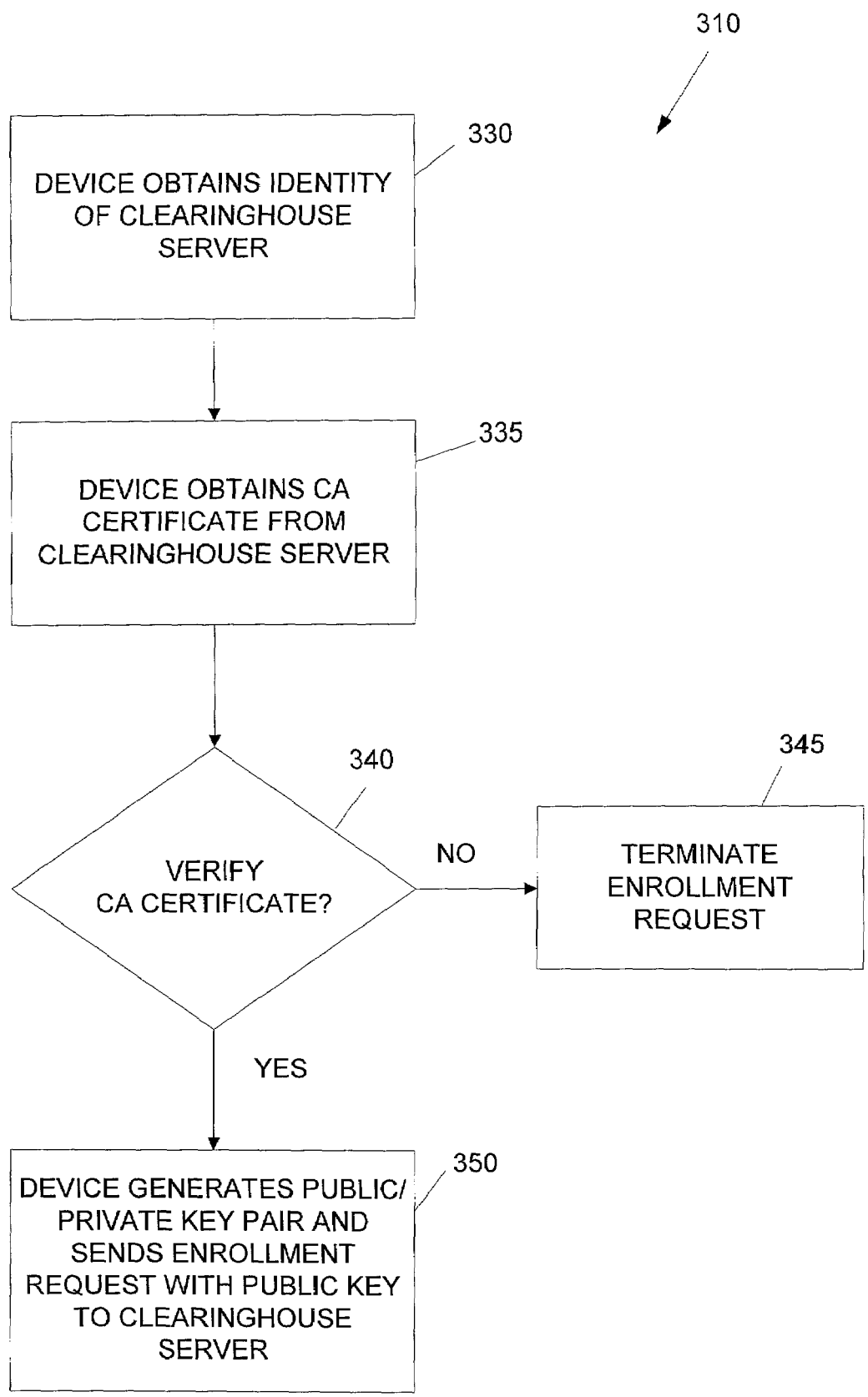
FIG. 3B is a logical flow chart diagram illustrating steps for completing an enrollment request by a source device in accordance with an exemplary embodiment of the present invention.

Turning briefly to FIG. 3B, the source device obtains the identity of the clearinghouse server in step 330. The identity is typically an IP address or a DNS name for the clearinghouse server. In step 335, the source device obtains a certificate authority (CA) certificate from the clearinghouse server 335 based upon an initial contact with the identified clearinghouse server via the IP network. In decision step 340, an inquiry is conducted to determine if the CA certificate can be verified as a certificate issued by a trusted device. For example, the verification task in decision step 340 can be completed by an administrator of the source device contacting a representative of the services offered by the clearinghouse server to verify the CA certificate. If the CA certificate can not be verified in decision step 340, the "NO" branch is followed to step 345 and the enrollment request process is terminated at the source device. Based on a positive response, however, the "YES" branch is followed from decision step 340 to step 350. In step 350, the source device generates a public/private key pair and sends an enrollment request with the public key to the clearinghouse server 350 via the IP network. Upon device enrollment, a configuration record or file for that device is constructed for storage in the configuration database accessible by the clearinghouse server.

Returning now to FIG. 3A, the source device sends an enrollment request via the IP network to the clearinghouse server in step 315. Responsive to the enrollment request, the clearinghouse server creates a public key certificate and sends that certificate to the source device via the IP network. This public key can be used by the source device to initiate secure communications with the clearinghouse server. In step 325, the clearinghouse server obtains device information and builds a configuration file for the source device. The configuration file is maintained at the configuration database and is accessible by the clearinghouse server. A representative configuration file is shown in Table 7.

TABLE 7

```
license 'software license key'
crypto 'keys'
enroll enabled
routing enabled
cdrs enabled
ssl enabled
group"
group 'ACME ITSP'
group 'BT-Concert'
group 'HK Telecom'
group 'Prepaid'
device 'device8.isp.com' '' enabled enrolled
device 'device1.itsp.com' 'ACME ITSP' enabled enrolled
device 'device2.itsp.com' 'ACME ITSP' enabled enrolled
device 'device3.itsp.com' 'ACME ITSP' disabled enrolled
device 'device4.carrier.com' 'BT-Concert' enabled enrolled
device 'device4.com' 'HK Telecom' enabled
device 'device5.com' 'HK Telecom' disabled
device 'device6.isp.com' 'Prepaid' enabled enrolled
device 'device7.isp.com' 'Prepaid' enabled enrolled
route '' '+1 . . .' 'device1.itsp.com' 60 'device2.itsp.com' 25 'device3.itsp.com' 15
    'device4.carrier.com' 0
route'' '+1 404 . . . ' 'device1.itsp.com' 75 'device2.itsp.com' 25 'device4.carrier.com' 0
route'' '+1 770 . . . ' 'device1.itsp.com' 75 'device2.itsp.com' 25 'device4.carrier.com' 0
route'' '+33 . . . ' 'device4.com' 1 'device5.com' 0
route'' '+33 6 . . . ' 'device4.com' 1 'device5.com' 0
route'' '+46 . . . ' 'device4.com' 1 'device5.com' 0
route'' '+46 70 . . . ' 'device4.com' 1 'device5.com' 0
route'' ' ' 'device6.isp.com' 100 'device7.isp.com' 0 'device8.isp.com' 0
route 'ACME ITSP' '+1 . . . ' ' device1.itsp.com' 60 'device2.itsp.com' 25
    'device3.itsp .com' 15 'device4.carrier.com' 0
route 'ACME ITSP' '+1 404 . . . ' 'device1.itsp.com' 75 'device2.itsp.com' 25
    'device4.carrier.com' 0
route 'ACME ITSP' '+1 770 . . . ' 'device1.itsp.com' 75 'device2.itsp.com' 25
    'device4.carrier.com' 0
route 'ACME ITSP' '+33 . . . ' 'device4.com' 1 'device5.com' 0
route 'ACME ITSP' '+33 6 . . . ' 'device4.com' 1 'device5.com' 0
route 'ACME ITSP' '+46 . . . ' 'device4.com' 1 'device5.com' 0
route 'ACME ITSP' '+46 70 . . . ' 'device4.com' 1 'device5.com' 0
route 'ACME ITSP' '' 'device6.isp.com' 100 'device7.isp.com' 0 'device8.isp.com' 0
route 'BT-Concert' '+1 . . . ' 'device1.itsp.com' 60 'device2.itsp.com' 25
    'device3.itsp.com' 15 'device4.carrier.com' 0
route 'BT-Concert' '+1 404 . . . ' 'device1.itsp.com' 75 'device2.itsp.com' 25
    'device4.carrier.com' 0
route 'BT-Concert' '+1 770 . . . ' 'device1.itsp.com' 75 'device2.itsp.com' 25
    'device4.carrier.com' 0
route 'BT-Concert' '+33 . . . ' 'device4.com' 1 'device5.com' 0
route 'BT-Concert' '+33 6 . . . ' 'device4.com' 1 'device5.com' 0
route 'BT-Concert' '+46 . . . ' 'device4.com' 1 'device5.com' 0
route 'BT-Concert' '+46 70 . . . ' 'device4.com' 1 'device5.com' 0
route 'BT-Concert' '' 'device6.isp.com' 100 'device7.isp.com' 0 'device8.isp.com' 0
route 'HK Telecom' '+1 . . . ' 'device1.itsp.com' 60 'device2.itsp.com' 25
    'device3.itsp.com' 15 'device4.carrier.com' 0
route 'HK Telecom' '+1 404 . . . ' 'device1.itsp.com' 75 'device2.itsp.com' 25
    'device4.carrier.com' 0
route 'HK Telecom' '+1 770 . . . ' 'device1.itsp.com' 75 'device2.itsp.com' 25
    'device4.carrier.com' 0
route 'HK Telecom' '+33 . . . ' 'device4.com' 1 'device5.com' 0
route 'HK Telecom' '+33 6 . . . ' 'device4.com' 1 'device5.com' 0
route 'HK Telecom' '+46 . . . ' 'device4.com' 1 'device5.com' 0
route 'HK Telecom' '+46 70 . . . ' 'device4.com' 1 'device5.com' 0
route 'HK Telecom' '' 'device6.isp.com' 100 'device7.isp.com' 0 'device8.isp.com' 0
route 'Prepaid' '' 'device1.itsp.com' 60 'device2.itsp.com' 25 'device3.itsp.com' 15
    'device4.carrier.com' 0
```

Each line in a configuration file (other than comments or blank lines) contains a single configuration item. The first word on the line identifies that item. The possible values for this word are listed below in Table 8.

TABLE 8

| | |
|---|---|
| license: | software license key for the clearinghouse server |
| crypto: | cryptographic keys for the clearinghouse server |
| enroll: | flag to enable/disable device enrollment |

TABLE 8-continued

| | |
|---|---|
| routing: | flag to enable/disable call routing |
| cdrs: | flag to enable/disable CDR collection |
| ssl: | flag to force clearinghouse server requests to use SSL for security |
| group: | a group (convenient collection) of devices |
| device: | a device (gateway, gatekeeper, proxy, softswitch, etc.) |
| route: | a route for a call |

The same configuration item may be included multiple times in this file. In such cases, the clearinghouse server's behavior depends on the specific item. In most cases, later occurrences of an item will override an earlier value. For example, if multiple "license" lines are included in the file, only the last line will actually be used by the server. In the case of "group", "device", and "route", multiple occurrences define additional groups, devices, or routes. Note, however, that it is not possible to define multiple groups with the same name, multiple devices with the same name, or multiple routes with the same group and called number. If the configuration file attempts to define duplicates, the server will generate an error when attempting to read and parse the file.

license "software license key"

The content following the license keyword should be a software license key enclosed in double quotation marks. If this parameter is absent from the file, or if the included license key is invalid, the underlying software supporting operations of the clearinghouse server will revert to a trial version. New software license keys may be obtained from a licensor of the clearinghouse server software. They can either be added to the configuration file manually or imported into the server through the user interface. Imported license keys are stored in configuration backups. Unlike other configuration items, old values of the license key are kept in the configuration file, allowing a straightforward reversion to an earlier license (by deleting the newest license keys), as well as problem diagnosis and auditing.

crypto "cryptographic parameters"

The content following the crypto keyword should be cryptographic parameters for the clearinghouse server enclosed in double quotation marks. If this parameter is absent, the clearinghouse server will automatically generate new cryptographic parameters. If this occurs, though, all enrolled devices will have to re-enroll with the server to refresh their cryptographic knowledge.

enroll {enabled|disabled}

The content following the enroll keyword should be a single word, either "enabled" or "disabled" (without the quotation marks), whichever is appropriate. If this parameter is not present, device enrollment will be disabled.

routing {enabled|disabled}

The content following the routing keyword should be a single word, either "enabled" or "disabled" (without the quotation marks), whichever is appropriate. If this parameter is not present, call routing will be disabled.

cdrs {enabled|disabled}

The content following the call details records) (cdrs) keyword should be a single word, either "enabled" or "disabled" (without the quotation marks), whichever is appropriate. If this parameter is not present, CDR collection will be disabled.

ssl {enabled|disabled}

The content following the ssl keyword should be a single word, either "enabled" or "disabled" (without the quotation marks), whichever is appropriate.

group name

The content following the group keyword should be the name of the group. If the name consists of more than one word, the entire name should be enclosed in double quotation marks.

device name group {enabled|disabled} [enrolled]

The content following the device keyword should be the DNS name of the device, the name of the group to which the device belongs (enclosed in quotation marks if the name is more than one word), the word "enabled" or "disabled" (without the quotation marks), and, optionally, the word "enrolled" (also without quotation marks).

route group number (device weight)

The content following the route keyword should be the name of the group to which the route applies (enclosed in quotation marks if the name is more than one word), the called number prefix for the routes (enclosed in quotation marks if the number includes spaces) and then a series of one or more device weight pairs, where device is the DNS name of the destination device, and weight is the weighting factor for that device.

It should be understood that the foregoing relates only to illustrative embodiments of the present invention, and numerous changes may be made therein without departing from the spirit and scope of the invention as defined by the following claims.

What is claimed is:

1. A method for a clearinghouse or routing policy server to securely enroll a client device for an Internet telephony system, comprising the steps:

receiving a first message via HTTP from a client Internet telephony device that comprises an automated request to obtain an identity of one of an Internet telephony clearinghouse and Internet telephony routing policy server, the request further comprising an automated computer programming variable operation that is set equal to alphanumeric text comprising 'getcacert' and that initiates a search for a certificate authority certificate;

responding to the request by transmitting a second message comprising the certificate authority certificate of one of an Internet telephony clearinghouse and Internet telephony routing policy server in a Base64 format and encoded in ASCII with content type set to text/html;

receiving a third message comprising a certificate request from the client Internet telephony device;

responding to the client Internet telephony device request by signing the certificate; and transmitting a fourth message comprising the certificate signed by a certificate authority of one of the Internet telephony clearinghouse and the Internet telephony routing policy server.

2. The method of claim 1, wherein the second message comprises a programming variable status that is set equal to alphanumeric text comprising '0&certificate'.

3. The method of claim 1, wherein the third message further comprises a computer programming variable operation that is set equal to at least one of a nonce value, a user's name, a user's password, an Internet telephony device identifier, a customer identifier, and a certificate request to be signed.

4. The method of claim 1, wherein the fourth message further comprises a computer programming variable entitled status that is set equal to alphanumeric text comprising '0&certificate'.

5. A method for a Internet telephony clearinghouse or Internet telephony routing policy server to securely enroll a client Internet telephony device for an Internet telephony communication system, comprising the steps:

receiving a first message from a client Internet telephony device that comprises an automated request to obtain an identity of one of an Internet telephony clearinghouse and Internet telephony routing policy server;

responding to the automated request by transmitting a second message comprising a certificate authority certificate of one of an Internet telephony clearinghouse and Internet telephony routing policy server to the client Internet telephony device;

receiving a third message comprising a certificate request from the client Internet telephony device, the certificate request comprising a nonce value, a user's name, a user's password, a Internet telephony device identifier, a customer identifier, and a certificate request to be signed;

responding to the client Internet telephony device request by signing the certificate; and transmitting a fourth message comprising the certificate signed by the certificate authority of one of the Internet telephony clearinghouse and Internet telephony routing policy server.

6. The method of claim 5, wherein the first message further comprises a computer programming variable entitled operation that is set equal to alphanumeric text comprising 'getcacert' that initiates a search for a certificate authority certificate.

7. The method of claim 5, wherein the first message further comprises a POST message received via HTTP.

8. The method of claim 5, wherein the second message further comprises certificate authority certificate in a Base64 format and encoded in ASCII with content type set to text/html.

9. The method of claim 5, wherein the second message further comprises a programming variable status that is set equal to alphanumeric text comprising '0&certificate'.

10. The method of claim 5, wherein the fourth message further comprises a computer programming variable entitled status that is set equal to alphanumeric text comprising '0&certificate'.

11. A method for a Internet telephony clearinghouse or Internet telephony routing policy server to securely enroll a client Internet telephony device for an Internet telephony system, comprising the steps:

receiving a first message from a client Internet telephony device that comprises an automated request to obtain an identity one of an Internet telephony clearinghouse and Internet telephony routing policy server;

responding to the request by transmitting a second message comprising a certificate authority certificate of one of an Internet telephony clearinghouse and an Internet telephony routing policy server to the client Internet telephony device, wherein the second message comprises a programming variable status that is set equal to alphanumeric text comprising '0&certificate' that indicates certificate authority information follows the alphanumeric text;

receiving a third message comprising a certificate request from the client Internet telephony device comprising a certificate request to be signed;

responding to the client Internet telephony device request by signing the certificate; and transmitting a fourth message comprising the certificate signed by the certificate authority of one of the Internet telephony clearinghouse and Internet telephony routing policy server.

12. The method of claim 11, wherein the first message further comprises an automated computer programming variable operation that is set equal to alphanumeric text comprising getcacert that initiates a search for a certificate authority certificate.

13. The method of claim 11, wherein the first message further comprises a POST message received via HTTP.

14. The method of claim 11, wherein the second message further comprises the certificate authority certificate in a Base64 format and encoded in ASCII with content type set to text/html.

15. The method of claim 11, wherein the third message further comprises a computer programming variable operation that is set equal to at least one of a nonce value, a user's name, a user's password, an Internet telephony device identifier, a customer identifier, and a certificate request to be signed.

16. The method of claim 11, wherein the fourth message further comprises a computer programming variable status that is set equal to alphanumeric text comprising '0&certificate'.

* * * * *